(12) United States Patent
Mace

(10) Patent No.: US 9,358,442 B2
(45) Date of Patent: Jun. 7, 2016

(54) METHOD FOR CALCULATING A REPEATABILITY INDEX WHEN USING A TENNIS RACKET

(71) Applicant: BABOLAT VS, Lyons (FR)

(72) Inventor: Pierre Mace, Lyons (FR)

(73) Assignee: BABOLAT VS, Lyons (FR)

( * ) Notice: Subject to any disclaimer, the term of this patent is extended or adjusted under 35 U.S.C. 154(b) by 194 days.

(21) Appl. No.: 13/899,881

(22) Filed: May 22, 2013

(65) Prior Publication Data
US 2013/0316855 A1 Nov. 28, 2013

(30) Foreign Application Priority Data

May 23, 2012 (FR) ...................... 12 54726

(51) Int. Cl.
A63B 69/38 (2006.01)
G09B 19/00 (2006.01)

(52) U.S. Cl.
CPC ............ *A63B 69/38* (2013.01); *G09B 19/0038* (2013.01)

(58) Field of Classification Search
CPC ................. A63B 69/002; A63B 69/38; A63B 2069/0008; A63B 2208/12; A63B 47/002
USPC .......................................................... 473/422
See application file for complete search history.

(56) References Cited

U.S. PATENT DOCUMENTS

| | | | | |
|---|---|---|---|---|
| 5,409,217 A | * | 4/1995 | Bobby | 473/425 |
| 5,757,266 A | * | 5/1998 | Rider et al. | 340/323 R |
| 5,807,196 A | * | 9/1998 | Pompeo | 473/463 |
| 7,815,516 B1 | * | 10/2010 | Mortimer et al. | 473/257 |
| 8,944,940 B2 | * | 2/2015 | Mettler | 473/461 |
| 2005/0054457 A1 | | 3/2005 | Eyestone et al. | |
| 2005/0288119 A1 | | 12/2005 | Wang et al. | |
| 2006/0052173 A1 | * | 3/2006 | Telford | 473/131 |
| 2007/0105664 A1 | * | 5/2007 | Scheinert | A63B 49/00 473/461 |
| 2008/0293022 A1 | * | 11/2008 | Cignarelli et al. | 434/247 |
| 2010/0323805 A1 | * | 12/2010 | Kamino et al. | 473/221 |
| 2011/0183787 A1 | * | 7/2011 | Schwenger et al. | 473/553 |
| 2012/0157241 A1 | * | 6/2012 | Nomura | A63B 69/0002 473/422 |
| 2013/0018493 A1 | * | 1/2013 | Amini | 700/91 |
| 2013/0018494 A1 | * | 1/2013 | Amini | 700/91 |
| 2013/0053190 A1 | * | 2/2013 | Mettler | G09B 19/0038 473/463 |
| 2013/0095962 A1 | * | 4/2013 | Yamamoto et al. | 473/464 |

OTHER PUBLICATIONS

French Search Report, dated Apr. 23, 2013, from corresponding French application.

* cited by examiner

*Primary Examiner* — Milap Shah
(74) *Attorney, Agent, or Firm* — Young & Thompson

(57) ABSTRACT

A method for calculating a repeatability index of gestures and shots of a player striking a tennis ball with a racket having attached measurement sensors. The method includes conducting an initial series of shots to measure vibration, angular velocity, and linear acceleration of the racket during each shot to generate behavioral data of the racket corresponding to each shot of the initial series, and later comparing the measured vibration, angular velocity and linear acceleration of the racket to shots of a further series to determine the type of hit and a repeatability index indicating an ability of the player to identically repeat each of the type of hit.

12 Claims, 2 Drawing Sheets

METHOD FOR CALCULATING A REPEATABILITY INDEX WHEN USING A TENNIS RACKET

FIELD OF THE INVENTION

This invention relates to a method for calculating a repeatability index of gestures and shots of a player striking a tennis ball with a racket.

BACKGROUND OF THE INVENTION

When a player plays tennis, it is useful to be able to analyse his performances, for example in order to evaluate and/or improve his playing technique. The player's level is characterised particularly by his ability to reproducibly perform gestures and shots. The better the technical control of a player, the better he will be able to perform an identical gesture whenever he wishes, particularly in training during which he applies the same type of hit for each shot.

SUMMARY OF THE INVENTION

The invention discloses a method for calculating an index for measurement of the repeatability of the player's gestures and shots based on measured playing data.

The invention achieves this by disclosing a method for calculating a repeatability index of the player's gestures and shots when striking a tennis ball with a racket, that comprises:
- a preliminary step a) in which behavioural data of the racket are generated during tests, the behavioural data indicating first playing data related to gestures and shots, such as vibrations, linear acceleration and angular velocity of the racket, as a function of parameters including at least several types of hits,
- a playing step b) in which the player strikes the balls with the racket and in which second playing data related to gestures and shots of the player, such as vibrations, linear acceleration and angular velocity of the racket, are measured,
- an analysis step c) in which
  - the second playing data are compared with the behavioural data,
  - the type of hit is deduced for each shot made in the playing step b), and
  - for each type of hit, the value of the repeatability index of the player's gestures and shots is determined by comparing the second playing data with each other, the repeatability index indicating the player's ability to repeat the hit type identically.

With the invention, measured data can be used to obtain a repeatability index that is an indicator of the player's performances, so that he or she can make a self-assessment and improve.

According to advantageous but not compulsory aspects of the invention, such a method may include one or several of the following characteristics, taken in any technically possible combination:
- During the preliminary step a) and the playing step b), behavioural data and playing data are obtained by measuring the vibrations, the angular velocity and the linear acceleration of the racket.
- The repeatability index is determined by comparing raw measurements output from the measurement system, namely output signals from sensors fixed to the racket and preferably related to vibrations, linear acceleration and the angular velocity of the racket, for hits of the same type made during playing step b).
- The repeatability index is determined by comparing at least one first parameter obtained from measurements output from the measurement system, namely from output signals from sensors fixed to the racket and preferably related to vibrations, linear acceleration and the angular velocity of the racket, for each hit of the same type made during the playing step b). A racket head is divided into several zones. The first parameter relates to the impact zone of the ball on the head. The repeatability index is expressed as a function of a first variable related to dispersion around a first average value of the first parameter.
- The repeatability index is determined by comparing at least one parameter, called second parameter, obtained from measurements output from the measurement system, namely from output signals from sensors fixed to the racket and preferably related to vibrations, linear acceleration and the angular velocity of the racket, for each shot of the same type made during the playing step b). The second parameter relates to the angle of orientation of the head. The repeatability index is expressed as a function of a variable called the second variable, related to dispersion of the second parameter about an average value, called second value.
- The repeatability index is determined by comparing at least one parameter, called third parameter, obtained from measurements output from the measurement system, namely output signals from sensors fixed to the racket and preferably related to vibrations, linear acceleration and the angular velocity of the racket, for each shot of the same type made during the playing step b). The third parameter relates to the quantity of effect transmitted to the ball. The repeatability index is expressed as a function of a variable, called third variable, related to dispersion around a third average value of the third parameter.
- The repeatability index includes at least three terms added together, each term depending on one of the variables.
- Each variable is a standard deviation or a coefficient of variation.
- Each variable is corrected by an adjustment coefficient that normalises the variable to bring it to a scale for which all the balls are struck identically.
- The method also comprises steps in which:
  - tests are done to compare shots made by highly skilled players with shots made by less skilled players,
  - each variable is corrected by a weighting factor that hierarchises the variables as a function of their relevance, as a function of these tests.

BRIEF DESCRIPTION OF THE DRAWINGS

The invention will be better understood and other advantages will appear more clearly after reading the following description of a measurement method conforming with the invention, given solely as an example and with reference to the appended drawings in which.

DETAIL DESCRIPTION OF THE INVENTION

Figure 1:
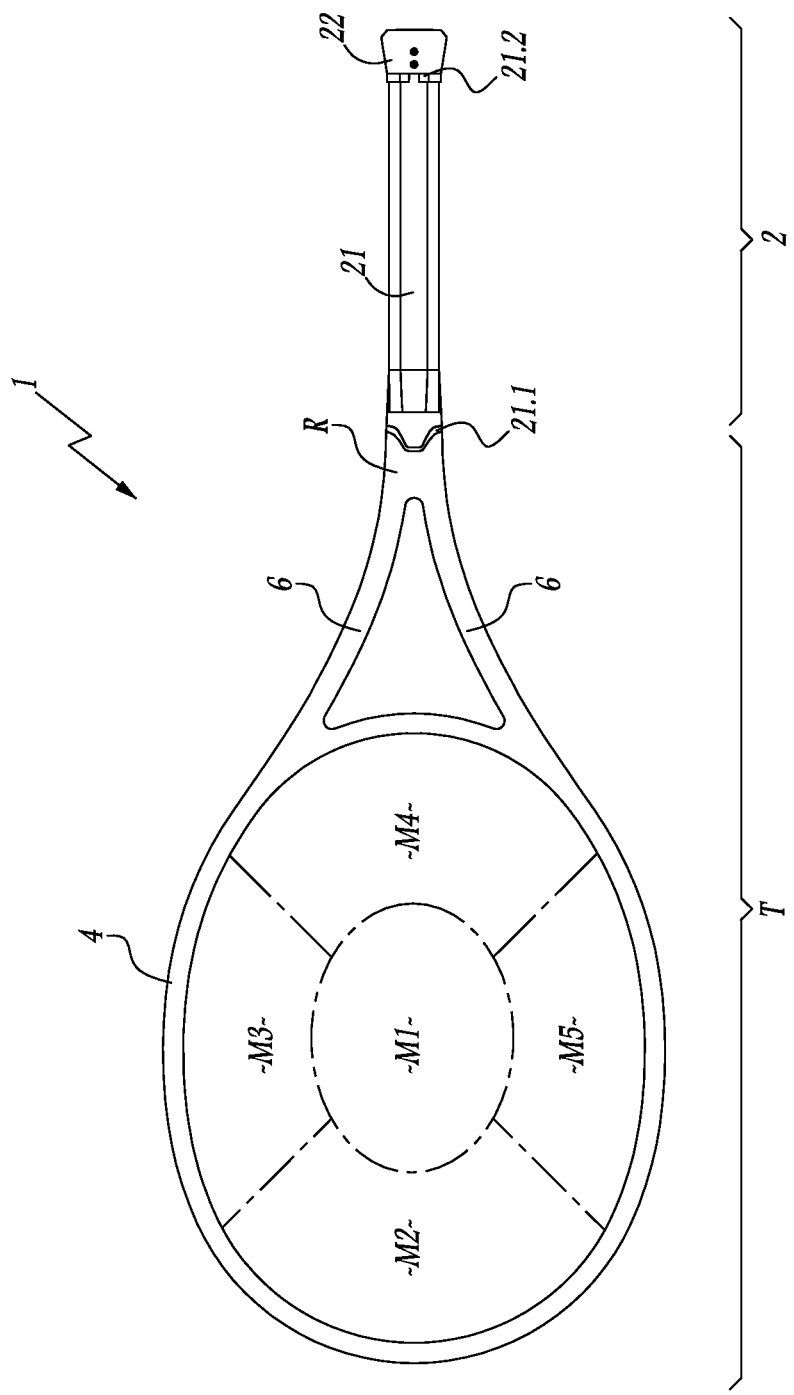
FIG. 1 is a front view of a racket that can be used with the method according to the invention.
Figure 2:
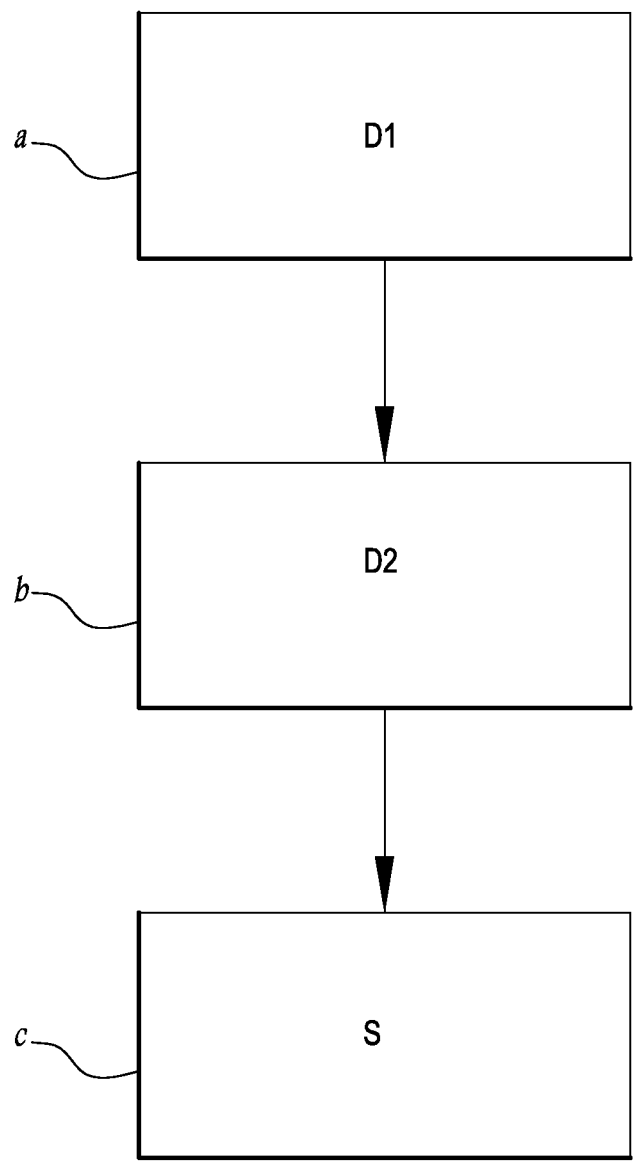
FIG. 2 is a diagram of the method according to the invention.

FIG. 1 shows a conventional tennis racket 1 that conventionally comprises a handle 2 connected to a head T including a frame 4 inside which a head 8, formed from different transverse and longitudinal strings, is tensed. The head T also comprises two connecting arms 6 that extend diverging from the handle 2 towards the frame 4.

The handle 2 comprises a globally tubular body 21 for example made of carbon. Conventionally, the body 21 is covered by a thickness of foam around which a grip is wrapped to improve the grip on the handle. The body 21 of the handle 2 comprises a proximal longitudinal end 21.1 located towards the head 8 and connected to the connecting arms 6, and a distal longitudinal end 21.2, free and opposite to the end 21.1. The end 21.2 is covered by a butt cap 22 that prevents the player's hand from slipping off the handle 2.

The racket 1 is fitted with a system for measuring the playing data, not shown, comprising at least one measurement sensor, for example a vibration sensor.

As a variant, the playing data measurement system does not form part of the racket 1. For example, it may be a camera that films the player.

The measurement system determines the linear acceleration and the angular velocity of the racket along three perpendicular directions fixed relative to the terrestrial reference frame.

The remainder of the description concerns a method for measuring and calculating a repeatability index S, by means of the racket 1.

In a preliminary step a), playing data are measured using the measurement system during preliminary tests, when a player makes specific types of hits (topspin forehand, service, slice backhand, etc.).

Each shot is characterised by several parameters. For example, a first parameter is the type of hit (forehand, backhand or service), determined as a function of the linear accelerations of the racket 1 and its angular velocities.

A second parameter is the type and quantity of effect (lift, slice or flat shot) determined as a function of the ratio between the angular velocity of the upward movement and the forward movement of racket 1, just before impact.

A third parameter relates to the striking power, determined at the time of impact, as a function of linear accelerations and angular velocities of the racket.

A fourth parameter is the location of the impact zone of the ball on the head 8, determined as a function of the measurements from the three sensors 14.1, 14.2, 14.3. The head 8 may be divided into several zones shown in FIG. 1: a globally circular central zone M1, and four peripheral zones M2, M3, M4 and M5 that divide the remaining part of the head 8 into four quarters: a front quarter M2 between the central zone M1 and the end of the frame 4 opposite the handle 2, a back quarter M4 between the central zone M1 and the part of the frame 4 connected to the connecting arms 6, and two side quarters M3 and M4 located on each side of the central zone M1, between the front quarter M2 and the back quarter M4. As a variant, the dividing of the zones and the number of zones may be different.

In the preliminary step a), behavioural data D1 of the racket 1 are generated that indicate playing data measured by the measurement system as a function of the player's gestures and shot parameters. Behavioural data D1 are stored in a memory on an analysis station, for example a computer, a smart phone or a graphic tablet. Behavioural data D1 will indicate for example vibrations, linear acceleration and the angular velocity of the racket 1 for each parameter.

Furthermore, during the preliminary step a), a relation is set up firstly between differences between behavioural data D1 for the same type of shot (forehand, slice backhand, service, etc.) and secondly, the value of the repeatability index S. This can be used to calibrate the repeatability index S, in other words to bring it onto a scale in which the maximum value corresponds to a virtual player who strikes all balls of the same type in the same way.

The preliminary step a) is done once only.

Then, in a playing step b), the player strikes the balls while the playing data measurement system measures the playing data D2 related to the player's gestures and shots, for example vibrations, angular velocity and the linear acceleration of the racket 1. In a first sub-step c1) forming part of an analysis step c), the analysis station compares playing data D2 measured during the playing step b) with behavioural data D1 measured during the preliminary step a), and for each shot in the playing step b) deduces the type of hit (forehand, slice backhand, service, etc.).

In a second sub-step c2) forming part of the analysis step c), the analysis station uses the comparison made during the sub-step c1) to determine the value of a repeatability index S of the player's gestures and shots. The repeatability index S is calculated for the series of shots in the playing step b) and characterises the player's ability to reproducibly perform gestures and shots. The repeatability index S is an indicator of the player's technical level.

In a first embodiment of the calculation method, the repeatability index S is determined in sub-step c2) using the calibration made in the preliminary step a), by directly comparing playing data D2 related to all shots of each type of hit in the series. "Directly" means that the repeatability index S is determined by comparing raw measurements output from the playing data measurement system. For example, raw measurements are particularly output signals from sensors fixed to the racket 1.

The technical level of the player is higher when the difference between the hits of the same type is small. Playing data D2 related to a particular type of hit are compared with each other for several successive instants in the gesture accompanying each shot. The analysis station synchronises playing data D2 for the same type of shot with each other, in other words it sets up a correspondence between corresponding successive instants in several hits of the same type made by the player during the playing step b).

The remainder of the description applies to a second embodiment of the calculation method in which the repeatability index S is determined in sub-step c2) by indirectly comparing playing data D2 with each other, in other words the repeatability index S is determined by means of an algorithm processing playing data D2.

For example, the repeatability index S is calculated from an algorithm based on three parameters P1, P2 and P3 obtained from measurements output from the measurement system; a first parameter P1 related to the position of the zone M1 to M5 of impact of the ball on the head 8, a second parameter P2 related to the angle of orientation of the head 8 during the shot, and a third parameter P3 related to the quantity of effect transmitted to the ball.

As explained previously, these three parameters P1, P2 and P3 are determined by comparing playing data D2 with behavioural data D1.

For example, parameters P1, P2 and P3 are obtained by analysing vibrations, linear acceleration and the linear velocity of the racket 1.

The repeatability index S indicates variations in each parameter P1, P2 and P3 for the series of shots made during the playing step b) on a given scale, for example from 0 to 10, and it may for example be expressed in the following form:

$$S = 10 \cdot (A1 \cdot B1 \cdot C1 + A2 \cdot B2 \cdot C2 + A3 \cdot B3 \cdot C3)$$

The repeatability index S comprises three terms added together, each term depending on a variable C1, C2 or C3 representing the dispersion of each parameter P1, P2 and P3 about its average value m1, m2 and m3.

For example, C1 is the standard deviation a1 of probabilities of impact in the different zones M1 to M5 of the head 8. The player's level is good when the ball always impacts the head 8 in the same zone, usually the central zone M1.

The standard deviation a1 is calculated by calculating the total number of times n1, n2, n3, n4 or n5 for which the ball struck each zone M1 to M5. The sum of numbers n1 to n5 is equal to the total number of shots N (n1+n2+n3+n4+n5=N).

The probability of impact p1 to p5 of the ball in each zone M1 to M5 is then calculated. For example, for the first zone M1, the probability p1 is equal to the number of times n1 that the ball struck zone M1, divided by the total number of shots N. For example, p1 may be equal to 0.55, which means that 55% of struck balls impacted zone Z1.

The sum of the probabilities of impact p1 to p5 is equal to 1. For example, p1=0.55, p2=0.3, p3=0.05, p4=0.05 and p5=0.05.

The standard deviation a1 is the standard deviation of the probabilities of impact p1 to p5. In the given example, the standard deviation a1 is equal to 0.2.

Terms C1, C2 and C3 are not necessarily standard deviations. This may be another indicator of the dispersion of probabilities, for example the coefficient of variation that is the standard deviation divided by the average.

Terms A1, A2 and A3 are weighting factors of parameters P1, P2 and P3.

By comparing a large number of shots made by high level players and lower level players, it is found that parameters P1, P2 and P3 are not all equally important to represent repeatability of player shots. For example, the parameters could be weighted as follows as a function of these tests, to hierarchise them: 40% for parameter P1, 40% for parameter P2 and 20% for parameter P3. In this example, A1=0.4, A2=0.4 and A3=0.2. The sum of the weighting indexes must be equal to 1 in order to avoid skewing the repeatability parameter P.

Terms B1, B2 and B3 are adjustment coefficients for parameters P1, P2 and P3 to normalise the terms C1, C2 and C3, in other words to calibrate the repeatability index S to bring it to a scale for which the maximum value corresponds to virtual performances of a player who strikes all balls of the same type in the same way.

For example, for term C1, the standard deviation a1 is not the same depending on the number of zones M1 to M5 into which the head is divided. The larger the number of zones M1 to M5, the more difficult it will be for the player to always strike the ball in the same zone. For example, term B1 is defined by the relation $B1=1/\sigma_M$, where $\sigma_M$ is the standard deviation of the probabilities of impact p1 to p5 of perfect playing, for which the ball strikes only zone M1 (p1=1 and p2=p3=p4=p5=0). In the given example, $\sigma_M$=0.44 and B1=1/0.44≈2.272.

The same principle is used to normalise terms C2 and C3.

The repeatability index S thus indicates a measurement on a scale of 0 to 10, of a player's ability to repeat his shots of the same type identically.

The invention claimed is:

1. A method for calculating a repeatability index of gestures and shots of a player striking a tennis ball with a racket, the method comprising:

preliminary steps of, using the racket comprised of a handle, a frame, inside which frame is a head formed from different transverse and longitudinal strings, the head being tensed, and measurement sensors, fixed to the racket, that measure at least vibrations, i) conducting a series of shots with the racket striking a respective tennis ball in each of said shots, ii) with data from the measurement sensors, measuring vibration, angular velocity, and linear acceleration of the racket during each said shot, and iii) generating behavioral data of the racket corresponding to each said shot of the racket;

wherein the shots of the racket include plural different types of hits by the racket on the tennis ball, the types of hits including at least a topspin forehand shot, a service shot, and a slice backhand shot, wherein the generated behavioral data includes data related to the measured vibration of the racket for each type of hit, the measured linear acceleration of the racket for each type of hit, and the measured angular velocity of the racket for each type of hit;

playing steps of i) conducting a further series of shots with the player striking the ball with the racket, wherein the shots of the further series of shots include the plural different types of hits by the racket on the tennis ball, including the topspin forehand shot, the service shot, and the slice backhand shot, ii) using the measured vibration, the measured linear acceleration, and the measured angular velocity from said measurement sensors of the racket for each hit made in the further series of shots, measuring the vibration, the angular velocity and the linear acceleration of the racket for each shot of the further series of shots, and iii) generating second playing data of the racket corresponding to each said shot of the further series of shots; and analysis steps of i) comparing a) the measured vibration, angular velocity and linear acceleration of the racket for each shot of the further series of shots to b) the behavioral data to determine the type hit, from the plural different types of hits, being used by the player in each shot of the further series of shots, and ii) for at least the shots of a first of said determined type of hit made in the further series of shots, determining a repeatability index of the player's shots of said first type of hits, by comparing a) the second playing data for each shot of the first type of hit with b) the second playing data for other shots of the first type of hit from the further series of shots, the repeatability index indicating an ability of the player to repeat each of the first type of hit identically.

2. The method for calculating according to claim 1, wherein the second playing data is based on raw measurements from output signals from said measurement sensors fixed to the racket, the measurement sensors measuring the vibrations, the linear acceleration, and the angular velocity of the racket, and the repeatability index is determined by comparing the raw measurements with each other for hits of the same type made during said playing steps.

3. The method for calculating according to claim 1, wherein, the second playing data includes at least a first parameter output from the output signals of said measurement sensors, the repeatability index is determined by comparing the first parameter for each hit of the same type made during the playing steps, wherein the head of the racket is divided into plural zones, wherein the first parameter relates to an impact zone of the ball on the head, and wherein the repeatability index is expressed as a function of a first variable related to dispersion, around a first average value, of the first parameter.

4. The method for calculating according to claim 3, wherein, the second playing data includes a second parameter output from the output signals of said measurement sensors, the second parameter relating to an angle of orientation of the head during each hit, the repeatability index is further determined by comparing the second parameter, for each shot of the same type made during the playing steps, and wherein the repeatability index is further expressed as a function of a second variable, related to dispersion of the second parameter, around an average value of the second parameter, called second value.

5. The method for calculating according to claim 4, wherein, the second playing data includes a third parameter output from the output signals of said measurement sensors, the third parameter relating to a quantity of effect transmitted to the ball during each hit, the repeatability index is determined by comparing the third parameter, for each shot of the same type made during the playing step, and the repeatability index is further expressed as a function of a third variable, related to dispersion around a third average value, of the third parameter.

6. The method for calculating according to claim 5, wherein the repeatability index includes at least three terms added together, each term depending on one of the first, second, and third variables.

7. The method for calculating according to claim 5, wherein each variable, of the first, second, and third variables, is a standard deviation or a coefficient of variation.

8. The method for calculating according to claim 5, wherein each variable, of the first, second, and third variables, is corrected by an adjustment coefficient that normalises the respective variable to bring the respective variable to a scale for which each respective ball is struck identically during each shot of the further series of shots.

9. The method for calculating according to claim 5, comprising the further steps of:

comparing shots made by highly skilled players with shots made by less skilled players, and each variable, of the first, second, and third variables, is corrected by a weighting factor that hierarchises the first, second, and third variables as a function of relevance, as a function of the comparison of the shots made by the highly skilled players with the shots made by the less skilled players.

10. The method for calculating according to claim 1, wherein, the racket further comprises two connecting arms that extend diverging from the handle towards the frame, and the handle comprises a tubular body.

11. A method for calculating a repeatability index of shots of a player striking a tennis ball with a racket, the method comprising:

preliminary steps of, with the racket comprised of a handle, a frame, inside which frame is a head formed from different transverse and longitudinal strings, the head being tensed, the head of the racket being divided into plural zones, and a system for measuring playing data comprising measurement sensors fixed to the racket that measure vibrations, linear acceleration, and angular velocity of the racket along three perpendicular directions fixed relative to a terrestrial reference frame, i) conducting a series of shots with the racket striking a respective tennis ball in each of said shots, ii) with the measurement sensors measuring movement of the racket during each said shot, including measuring vibrations, linear acceleration, and angular velocity of the racket during each of said shots, and iii) from the sensors measurements of the vibrations, the linear acceleration, and the angular velocity of the racket during each of said shots generating behavioral data of the racket corresponding to each said shot;

wherein the shots of the racket include plural different types of hits by the racket on the tennis ball, the types of hits including at least a topspin forehand shot, a service shot, and a slice backhand shot, wherein the generated behavioral data includes data related to the measured movement of the racket for each type of hit;

playing steps of i) conducting a further series of shots with the player striking the ball with the racket, ii) using the data of the measurement sensors, measuring the movement of the racket for each shot of the further series of shots including vibrations, angular velocity, and linear acceleration of the racket, and iii) generating second playing data corresponding to each said shot of the further series of shots;

wherein the shots of the further series of shots include the plural different types of hits by the racket on the tennis ball including at least plural shots of a first type of hit from said plural different types of hits, wherein the second playing data relates to the measured movement of the racket for each hit made in the further series of shots;

analysis steps of i) for each shot, comparing the second playing data to the behavioral data to determine the type of hit made by the player, and iii) for each of the plural shots of the first type of hit in the further series of shots, determining a repeatability index of the player's shots of said first type of hit, by comparing a) the second playing data for each shot of the first type of hit with b) the second playing data for other shots of the first type from the further series of shots, the repeatability index indicating an ability of the player to repeat each of the first type of hit identically.

12. The method of claim 11, wherein, the second playing data includes a first parameter output based on an impact zone of the ball on the head, and the repeatability index is expressed as a function of a first variable related to dispersion around a first average value of the first parameter, the second playing data includes a second parameter relating to an angle of orientation of the head during each hit, the repeatability index is further expressed as a function of a variable called the second variable, related to dispersion of the second parameter about an average value, called second value, and the second playing data includes a third parameter relating to a quantity of effect transmitted to the ball during each hit, the third parameter obtained from measurements output of the vibrations, the linear acceleration, and the angular velocity of the racket measured by the sensors.

\* \* \* \* \*